US009644319B2

(12) United States Patent
Rosset et al.

(10) Patent No.: US 9,644,319 B2
(45) Date of Patent: May 9, 2017

(54) HYBRID SHEET, SUCH AS A SECURITY SHEET, FORMED BY ASSEMBLING A FIBROUS PART AND A PLASTIC PART

(75) Inventors: Henri Rosset, Le Pin (FR); Sébastien Charignon, Saint Ondras (FR)

(73) Assignee: ARJOWIGGINS, Issy les Moulineaux (FR)

( * ) Notice: Subject to any disclaimer, the term of this patent is extended or adjusted under 35 U.S.C. 154(b) by 1094 days.

(21) Appl. No.: 12/373,114

(22) PCT Filed: Jul. 12, 2007

(86) PCT No.: PCT/FR2007/051658
§ 371 (c)(1),
(2), (4) Date: Mar. 16, 2009

(87) PCT Pub. No.: WO2008/007035
PCT Pub. Date: Jan. 17, 2008

(65) Prior Publication Data
US 2009/0291245 A1    Nov. 26, 2009

(30) Foreign Application Priority Data

Jul. 13, 2006  (FR) ..................... 06 06452

(51) Int. Cl.
*D21H 19/10* (2006.01)
*B32B 3/02* (2006.01)
(Continued)

(52) U.S. Cl.
CPC .............. *D21H 19/10* (2013.01); *B32B 3/02* (2013.01); *B32B 3/26* (2013.01); *B32B 3/266* (2013.01);
(Continued)

(58) Field of Classification Search
None
See application file for complete search history.

(56) References Cited

U.S. PATENT DOCUMENTS 4,183,989 A * 1/1980 Tooth .......................... 428/195.1
6,036,230 A * 3/2000 Farber ............................. 283/58
(Continued)

FOREIGN PATENT DOCUMENTS

AU      2005318857 B2    6/2006
EP       0 059 056 A1    9/1982
(Continued)

OTHER PUBLICATIONS

Notice of Opposition in German w/English-machine translation in Application No. 07823579.3 dated Feb. 15, 2013.
(Continued)

*Primary Examiner* — Anthony J Frost
(74) *Attorney, Agent, or Firm* — Oliff PLC

(57) ABSTRACT

The invention relates to a sheet of a given size, having a rear face and a front face. The invention is characterised in that it includes at least one part which is made from fibrous material and at least one other part which is made from plastic material and which is adjacent to the fibrous part, said parts being joined at a zone in which the two materials overlap. The plastic part at least partially forms a side zone of the sheet that is free of fibrous material and the plastic part includes at least one transparent or translucent zone.

62 Claims, 4 Drawing Sheets

Figure 1:
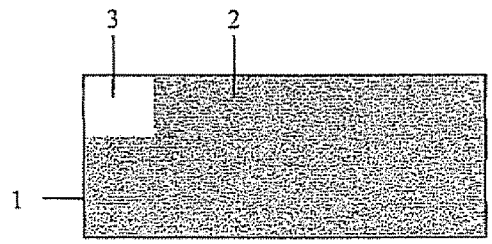
Figure 2:
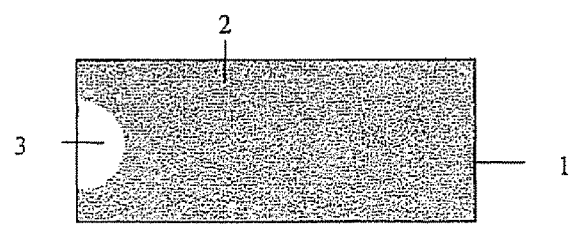
Figure 3:
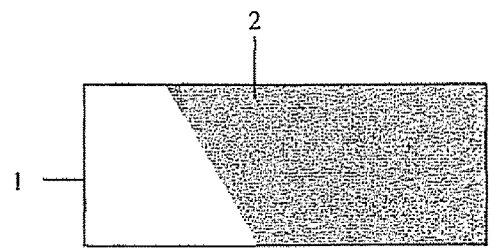
Figure 4:
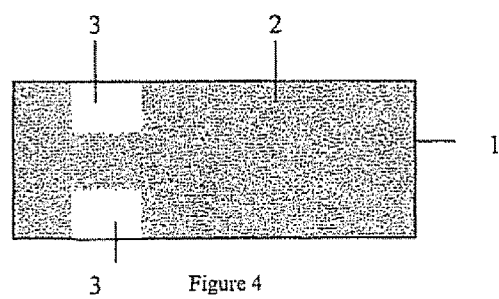
Figure 5:
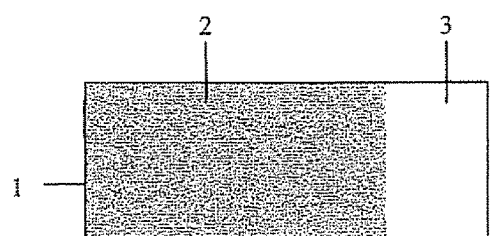
Figure 6:
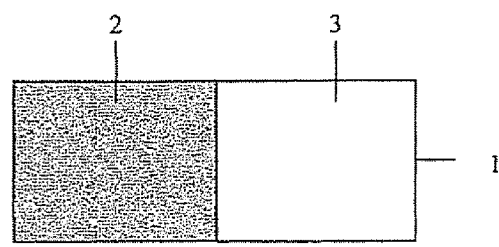
Figure 7:
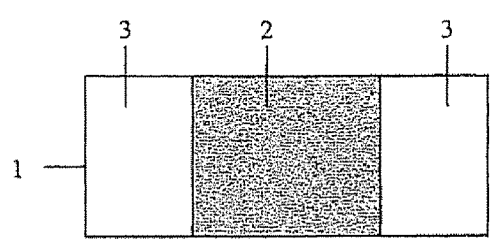

(51) Int. Cl.

| | | |
|---|---|---|
| *B32B 3/26* | (2006.01) | |
| *B32B 5/14* | (2006.01) | |
| *B32B 7/12* | (2006.01) | |
| *B32B 9/02* | (2006.01) | |
| *B32B 9/04* | (2006.01) | |
| *B32B 27/06* | (2006.01) | |
| *B32B 27/10* | (2006.01) | |
| *B32B 27/12* | (2006.01) | |
| *B32B 27/32* | (2006.01) | |
| *B32B 29/02* | (2006.01) | |
| *D21H 21/40* | (2006.01) | |

(52) U.S. Cl.
CPC .......... *B32B 5/14* (2013.01); *B32B 7/12* (2013.01); *B32B 9/02* (2013.01); *B32B 9/04* (2013.01); *B32B 27/06* (2013.01); *B32B 27/10* (2013.01); *B32B 27/12* (2013.01); *B32B 27/32* (2013.01); *B32B 29/02* (2013.01); *D21H 21/40* (2013.01); *Y10T 428/197* (2015.01)

(56) References Cited

U.S. PATENT DOCUMENTS

| | | | |
|---|---|---|---|
| 6,402,888 B1 | 6/2002 | Doublet et al. | |
| 2001/0007066 A1* | 7/2001 | Mizutani et al. | 604/372 |
| 2001/0018113 A1 | 8/2001 | Mallol et al. | |
| 2002/0022112 A1 | 2/2002 | Hoeppner et al. | |
| 2002/0112833 A1* | 8/2002 | Beghello et al. | 162/140 |
| 2004/0239097 A1* | 12/2004 | Boehm et al. | 283/57 |
| 2005/0016702 A1* | 1/2005 | Ash et al. | 162/140 |
| 2005/0224203 A1 | 10/2005 | Boehm et al. | |
| 2006/0127649 A1* | 6/2006 | Keller et al. | 428/195.1 |
| 2006/0198987 A1* | 9/2006 | Grob et al. | 428/137 |
| 2007/0014940 A1* | 1/2007 | Linhart et al. | 428/32.3 |

FOREIGN PATENT DOCUMENTS

| | | | | |
|---|---|---|---|---|
| EP | 0 229 645 A1 | 7/1987 | | |
| EP | 1 122 360 A1 | 8/2001 | | |
| FR | 2 764 314 A1 | 12/1998 | | |
| GB | 2267253 | * | 5/1993 | |
| GB | 2 267 253 A | 12/1993 | | |
| WO | WO 94/20679 | 9/1994 | | |
| WO | WO 95/09274 | 4/1995 | | |
| WO | WO 95/10419 | 4/1995 | | |
| WO | WO 98/13211 | 4/1998 | | |
| WO | WO 00/50238 | 8/2000 | | |
| WO | 03/029003 A1 | 4/2003 | | |
| WO | WO 03/054297 A2 | 7/2003 | | |
| WO | WO 2004/028825 A2 | 4/2004 | | |
| WO | WO 2004076198 A1 | * | 9/2004 | ......... B42D 15/10 |
| WO | WO 2004096566 A1 | * | 11/2004 | ......... B41M 5/00 |
| WO | WO 2006/066431 | 6/2006 | | |

OTHER PUBLICATIONS

Opposition Brief in German w/English-machine translation dated Jan. 9, 2013.

\* cited by examiner

HYBRID SHEET, SUCH AS A SECURITY SHEET, FORMED BY ASSEMBLING A FIBROUS PART AND A PLASTIC PART

The invention relates to a hybrid sheet, particularly a security sheet, formed by assembling a fibrous part and a plastic part.

The invention is intended in particular for application to banknotes which must be able to withstand circulation and which are made in particular by offset printing and by copperplate printing requiring high pressures.

In patent application WO 95/09274, a security paper is described having a transparent plastic through window obtained by inserting a plastic film between the two plies of fibrous material. A through hole is formed respectively in two paper plies undergoing formation, by means of relief parts incorporated in the wirecloth of a cylinder mold paper machine, these reliefs preventing the deposition of pulp fibers in certain places during the formation of the paper ply, a transparent plastic strip is then inserted when the two paper plies are joined in order to position the hole of one ply facing the hole of the other ply and to insert the plastic strip at the location of the superimposed holes.

In patent application FR 2 764 314, a sheet is described comprising at least one transparent or translucent through window, in particular the window may be produced by inserting a strip between two sheets, particularly as described in abovementioned document WO 95/09274, the window cooperating with an element carried on the rest of the sheet when it is folded to create an authentication. Similarly, patent application WO 03/054297 describes an opening created during the formation of the paper and which has characteristic irregularities in the edge zones. This opening may be covered with a plastic film on one or both faces of the paper, thereby obtaining a transparent window.

Paper sheets for producing security documents have the advantage of being easily printable and having good resistance to incipient tearing, in particular conventional banknotes, in which the cotton fiber core has a high resistance, deriving from the combined effect of the length of the cotton fibers, their intrinsic strength and their entanglement in the sheet. However, their other features of withstanding circulation may be slightly weak.

In patent application EP 0 935 535, a security document and particularly a banknote made from plastic is described, based on a transparent polymer film, coated on each of its faces with at least one coat with one layer of opacifying ink, while leaving an uncoated zone on one of the faces, thereby forming a window, so that the security elements contained in the plastic core are visible on this face. These documents are characterized by a clearly defined window, and have the added advantage of being able to withstand circulation thanks in particular to their low porosity, their wet strength, their resistance to fats or other agents liable to accelerate the aging of the documents.

However, a first drawback of the plastic documents is that they are much less resistant to incipient tearing than paper sheets. A plastic film does not have the strength features provided by the fibers, which implies that an incipient tear in such a film propagates much more easily than in a fibrous sheet.

Another drawback of security sheets based on plastic is that they are unsuitable for copperplate printing, which requires high pressures. This is because the plastic has a substantially lower compressibility than paper, which leads to a very flat copperplate print without relief. This is a non-negligible drawback insofar as the copperplate printing method is very commonly used in the area of security documents and particularly banknotes.

Another drawback is that the strength of the printing deteriorates during handling of the plastic document, particularly at the folds if the document happens to be folded or crumpled often, as is the case of banknotes during their circulation. Moreover, the crease remains more pronounced for a plastic banknote than for a paper banknote.

Finally, the production of watermarks in security sheets based on plastic remains problematic, thereby depriving plastic security documents of an effective type of security element, commonly and manifestly used in the field of security documents.

It is a first object of the invention to provide a sheet or a document having novel and improved features, for its authentication and securization, so that it is particularly difficult to forge.

It is a second object of the invention to provide a sheet, particularly a security sheet, offering increased ability to withstand circulation, that is both mechanical stresses such as folding, stretching or tearing, in particular incipient tearing and service stresses such as soiling or yellowing.

A further object of the invention is to provide a sheet or a document, particularly a security document, having a high print rendering particularly in offset and/or copperplate printing.

The Applicant has found that the objects of the invention are achieved by providing a hybrid sheet that is partly fibrous and partly plastic.

The invention thus relates to a sheet of a given size, having a rear face and a front face, which is characterized in that it comprises at least one part made from fibrous material and at least one other part made from plastic material, which is adjacent to the fibrous part said parts being joined at a zone in which the two materials overlap (bridging), and the plastic part at least partially forming a side zone of said sheet that is free from fibrous material, and said plastic part comprising at least one transparent or translucent zone.

The sheet according to the invention has the advantage of allowing tactile authentication by the difference between the touch of the fibrous material, particularly of a paper, and the touch of the plastic material that is accessible particularly on the edge of the sheet. This advantage is particularly reinforced as the area of the plastic material and/or the fibrous material is sufficiently large and/or positioned in order to be perceptible to the touch and therefore differentiable from the rest of the document during its handling.

The sheet according to the invention optionally also has the possibility of auditory recognition by the respective sound of each part emitted when the sheet is snapped, the snapping sound of the fibrous part, particularly a paper for example, being different from that of a plastic.

Furthermore, in comparison with an all-plastic sheet, the sheet according to the invention has improved mechanical durability, in particular in the overlap zone where it combines the good resistance to incipient tearing of the paper and the good resistance to non-incipient tearing of the plastic.

This feature is particularly advantageous when the sheet happens to be folded, as for example for a banknote. In this case, the sheet has a degradation zone corresponding to the folding zone, generally a median zone. It is then advantageous for the median zone to be prepared from fibrous material, the plastic zone thereby being off-centered with regard to the median zone.

Preferably, particularly for a security document such as a banknote, the sheet according to the invention has the shape of a quadrilateral, more particularly a rectangle or a square, of which the length of each of the sides is at least 50 mm and at most 200 mm.

Preferably, the zone made from plastic material, and free of fibrous material, is such that its area is larger than 1 cm², preferably larger than 3 cm², and that at least at one point, its width has a value strictly larger than 10 mm, preferably larger than or equal to 15 mm, even more preferably larger than or equal to 20 mm. This serves in particular to facilitate the difference in tactile and visual perception between the fibrous and plastic parts of the sheet.

Preferably, said transparent or translucent zone of the plastic part is located in the side zone of the sheet.

According to a particular case of the invention, the overlap zone has delimited dimensions, lower than those respectively of each of the fibrous and plastic parts, in particular a dimension of between 1 and 50% of one of the dimensions of the size of the foil, more particularly between 2 and 15%. Preferably and according to the respective dimensions of the plastic and fibrous parts, the overlap zone is such that each of its dimensions is larger than 5 mm, in particular larger than or equal to 10 mm, preferably larger than or equal 20 mm, in order to guarantee good mechanical strength of this junction.

According to another particular case of the invention, the overlap zone may extend over the whole surface of the fibrous part, that is, the fibrous material may be as far as completely covered by the plastic material and furthermore, a part of the plastic material remains free of fibrous material (without overlap with the fibrous material) and which at least partially forms a side zone of the sheet.

According to a particular preferred case, the plastic part continuously overlaps the fibrous material in the overlap zone.

According to a particular case of the invention, the plastic part discontinuously overlaps the fibrous material in the overlap zone.

For example, the plastic material extends on either side of the fibrous material, that is, the fibrous material is completely covered by the plastic material and in addition, the plastic material extends beyond at least two sides of the fibrous part and thereby at least partially forms two side zones of the sheet, or even three or four side zones, that is a plurality of edges of the sheet.

According to a particular case of the invention, the plastic part, which is free of fibrous material, represents between 25 and 50% of the total surface of said sheet.

More particularly, the plastic part, which is free of fibrous material, represents between 30 and 40% of the total surface of said sheet.

According to another particular case, of the invention, the plastic part, which is free of fibrous material, represents more than 70% of the total surface of said sheet, the fibrous part thereby appearing as an inclusion through the plastic part. In particular, the fibrous part may be provided with a watermark, which serves to obtain a high level of security for the document. This serves in particular to provide a sheet that is nearly completely made from plastic and provided with a watermark, whereas it is difficult to produce watermarks in plastic.

Even more preferably, the hybrid sheet according to the invention is such that the parts made from plastic material and from fibrous material, particularly paper, overlap on either side in the overlap zone. This serves to ensure better cohesion of said foil and to reinforce the solidity of the junction between the fibrous part and the plastic part.

In this case, according to a preferable embodiment of the invention, the plastic material overlaps the fibrous material on either side, in the overlap zone. This serves to obtain a sheet which has good symmetry and good planeity and thereby avoid curling of said sheet.

According to another embodiment of the invention, the fibrous material overlaps the plastic material on either side, in the overlap zone.

According to a particular case of the invention, the fibrous and/or plastic parts have particular cutouts which enable them to form, alone or in combination, motifs, symbols or inscriptions at their junction.

In a preferred embodiment of the invention, the fibrous part has a particular cutout and the plastic part is transparent at least in the overlap zone.

According to a particular and preferred case of the invention, the fibrous material—plastic material overlap zone does not have a substantial extra thickness, particularly barely perceptible to the touch. For example, the sheet has a substantially constant thickness of about 100 μm to make a banknote. More particularly, at the overlap zone, the fibrous material and/or the plastic material have a lower thickness than their respective thickness in the rest of the sheet. Preferably, the fibrous and plastic materials both have a lower thickness in the overlap zone. For example, the fibrous part and the plastic part have a respective thickness of 100 μm outside the overlap zone and a thickness of 50 μm in the overlap zone. In another example, the fibrous part and the plastic part also respectively have a thickness of 100μm outside the overlap zone, and the plastic part extends on either side of the fibrous part in the overlap zone, so that in said overlap zone, the fibrous part has a thickness of 50 μm, and is surrounded on either side by a plastic film having a thickness of 25 μm.

More particularly according to the invention, the fibrous material comprises a thinned zone at said overlap zone, this thinned zone particularly being a light watermark or a multitone watermark composed of light zones arranged in order to constitute a shuted motif, said motif having a meaning, particularly for authentication. Such a watermark with shuted motif is described in patent application EP 1 122 360. This thinned zone may also be obtained by crushing methods, for example, said thinned overlap zone is a calendered or laminated zone.

Advantageously, the hybrid sheet according to the invention is such that the plastic material and/or the fibrous material, particularly of paper, comprises perforations at least in their overlap zone, the perforations optionally not being completely through perforations. Some of said perforations preferably have a size such that the fibers of the fibrous material can be entangled therein and serve to imbricate the two fibrous and plastic materials, optionally provided with an adhesive, one into the other, and thereby reinforce the cohesion of the sheet. These perforations may, for example, be produced by punching, by die cutting, laser cutting, ultrasonic cutting, or by fluid jet cutting, particularly by water jet cutting.

The perforations may have various shapes and dimensions according to the desired effects. Preferably, to ensure the joining between the fibrous and plastic parts, at least 50% of said perforations have a size such that each of these perforations can be inscribed in a circle having a diameter higher than 0.05 mm. In particular, this diameter may be between 0.05 and 10 mm. Moreover, the perforations may serve as a code, an authentication system, or may even represent an alphanumeric motif or a design or any other meaning.

According to a particular case of the invention, said perforations cooperate with visible characters, mentioned or appearing on at least one of the faces of the sheet, to form data when the sheet is folded.

More particularly, according to the invention, said perforations cooperate, when the sheet is folded on one side, to form first data with visible characters, mentioned or appearing on the front face of the sheet and cooperate, when the sheet is folded on the other side, with visible characters, mentioned or appearing on the rear face of the sheet, said characters being identical to or different from the characters of the front face, to form second data, identical to or different from the first data, when the sheet is folded on the other side.

In the context of the present invention, "visible" means that said characters are directly perceptible to the human eye, but also that said characters may be made visible to the human eye by means of a magnifying apparatus (magnifying glass, microscope, thread counter) and furthermore optionally, after excitation under radiation, particularly ultraviolet or infrared radiation.

In the particular case in which the plastic material comprises a zone which overlaps the fibrous material, particularly of paper, on either side, and if this overlap zone comprises perforations, the plastic can then diffuse through the paper and thereby consolidate the overall structure. The bond across the perforations can be provided either by fusion/solidification of the plastic, or by reaction of two products which are respectively present on the faces of the plastic films or layers placed in contact, for example a two-component adhesive or a pressure sensitive adhesive, an adhesive based on natural isoprene (natural rubber) or synthetic isoprene having the properties of sealing to itself.

In the overlap zone, the adhesive and/or the plastic material may contain one or more security elements on one or on both faces placed in contact with the other support.

According to a particular case, the fibrous part is based on natural fibers, particularly cellulose fibers, in particular cotton, and/or synthetic fibers (for example polyester or polyamide fibers) and/or optionally mineral fibers.

More particularly, the fibrous part is a paper or a nonwoven fabric.

According to a particular case of the invention, the plastic material is a polymer film, if applicable with adhesive, said film being laminated or pasted for example.

According to another particular case of the invention, the plastic material is an extruded or co-extruded layer of one or more polymers.

According to a particular case of the invention, the plastic material is based on a transparent or translucent polymer, but certain elements, particularly the security elements, may be present in the mass and/or on the surface of said plastic material. It may in particular comprise holograms or other elements having an optical effect, particularly variable.

The polymers that can be included in the composition of the plastic material, which may be an extruded layer or a film, may be selected particularly from the following polymers:
1) addition-polymerized resins such as a
   a) polyolefinic resins which may have variable densities and variable degrees of branching such as, for example, polyethylene, polypropylene, polymethylpentene;
   b) elastomer resins such as for example ethylene-propylene-diene-monomers, poly(acrylonitrile-butadiene-styrene), poly(styrene-butadiene-styrene), polybutadiene, polyisoprene;
   c) vinyl resins such as for example, polyvinyl chloride, polyvinyl acetate, poly(ethylene/vinyl acetate), poly(ethylene/vinyl alcohol);
   d) halide resins such as for example, polyvinyl chloride, polychloroprene, polyvinylidene-chloride, polytetrafluoroethylene;
   d) styrene resins such as for example, polystyrene, polystyrene-acrylonitrile, polystyrene-butadiene-styrene;
   e) acrylic resins such as for example, polymethyl methacrylate, polyacrylonitrile, poly(acrylonitrile-butadiene-styrene), poly(ethylene methyl acrylate);
   f) ionomer resins;
2) resins polymerized by condensation such as:
   a) polyester resins such as for example, polyethylene terephthalate, polybutylene terephthalate, polyethylene glycol terephthalate, glycerophthalics,
   b) polyamide resins;
   c) polycarbonate resins;
   d) polyurethane resins;
   e) polyimide resins;
   f) polyacetal resins, such as for example polyvinyl butyral;
   g) polyether resins, such as for example polyoxymethylene;
   h) epoxy resins;
   i) aminoplast resins;
   j) phenoplast resins;
   k) silicone resins;
3) resins derived from natural cellulose such as:
   a) viscose;
   b) cellulose acetate.

In the context of the present invention, polymers mean homopolymers, copolymers, grafted copolymers and possible blends thereof. These polymers may be thermoplastic, elastomers, inherently crosslinked, crosslinked chemically, thermally or by irradiation, saturated or unsaturated.

According to a particular case of the invention, the plastic material comprises one or more luminous dyes and/or pigments and/or interferential pigments, and/or liquid crystal pigments and/or even a specific material which collects light ("waveguide"). Such luminous light collecting materials which may be suitable are, for example, polymer films based on polycarbonate, called LISA® and sold by BAYER.

According to a particular case of the invention, the plastic material is an interferential multilayer film.

According to a particular case of the invention, the plastic material is formed from two polymer layers having different colors and/or luminosities and/or interference effects or luminous light collectors.

According to a particular case of the invention, the plastic part is covered, at least partly, with a layer that is printable and/or promotes the adhesion of ink. For example, the plastic part may receive a treatment particularly of the Corona, plasma or flame type. The plastic part may also be made printable by deposition of a layer improving the printability on the surface of said plastic part. For example, the plastic part may be covered with a layer containing a binder such as a styrene-butadiene polymer and mineral fillers.

According to a particular case of the invention, the plastic part is covered at least partially with a layer having anti-soiling and/or printability properties. For example, the plastic part may be covered with a transparent layer comprising a colloidal silica and a binder, for example a polyurethane.

According to a particular case of the invention, said sheet is a security sheet comprising at least one security element.

According to a particular case of the invention, said fibrous part contains security elements, particularly selected from watermarks, plates, luminous and/or iridescent fibers and/or pigments, security wires, magnetic fibers and mixtures thereof.

According to a particular case of the invention, said plastic part contains security elements, particularly selected from luminous and/or iridescent fibers and pigments, magnetic fibers and mixtures thereof.

According to a particular case of the invention, said plastic material is a luminous light collecting material located in a zone of the side part of the foil for observing the luminosity on the edge of the foil.

According to a particular case of the invention, said plastic material is a transparent or translucent luminous light collector, which comprises engraved, embossed, or printed motifs particularly in negative for observing the luminosity on the surface, at least at the motifs.

According to particular case, said plastic material comprises a chip, said chip being inserted for example between two sheets of plastic material.

The invention also relates to a security document, particularly a banknote, comprising a sheet as previously described.

The invention further provides a security sheet having securization and authentication elements incorporated in or applied on the various materials of its composition, that is in the fibrous material, particularly the paper, and/or in the plastic material, and/or in the layer(s) optionally applied to the surface of the sheet.

The security sheet thus produced may contain various sorts of security elements and particularly security elements introduced into the fibrous material, particularly based on cellulose fibers, in the wet section of a paper machine such as plates, luminous fibers colored or not (activable particularly under UV), luminescent (fluorescent or phosphorescent) pigments, metal and/or magnetic fibers, electricity conducting fibers, security wires. These may, for example be security wires that are magnetic, luminous, having an optically variable effect, in particular holographic, with or without text, appearing or not appearing on the surface of the paper, such as for example a security wire appearing in the windows of a sheet of paper, described in application EP 0 059 056. Other security elements such as a watermark, particularly a multitone watermark, may be added and also constitutes securization elements of the fibrous part. Similarly, security elements can be introduced into the plastic material, such as metal and/or magnetic powders and fibers, sensitive to microwaves, markers visible under UV light, detectable by infrared (near or far infrared).

In the case of a sheet of which the fibrous part comprises two plies, one or more authentication elements can be introduced between the two plies, such as security wires or magnetic fibers, such for example a two-ply banknote fabricated from security sheets according to the invention.

When the polymer layer or film is transparent, an advantage provided by the security sheet according to the invention is that the polymer layer or film does not alter the observation of the imprints and of the security elements present on the sheet. One can therefore consider the formation in the security sheet of a conventional watermark in the fibrous material, particularly shaded, or of a multitone watermark also called "screen watermark" and described in patent application EP 1 122 360, both being perfectly observable in print through.

Preferably, in order to be transparent, the plastic part will have a glossy surface. However, it will be possible, particularly in the case of an extruded layer, to have a plastic with a satiny or matt, or even textured, appearance.

According to one embodiment of the invention, various security elements may be combined together in order to create novel security elements such as depth effects or differences in intensity or gloss for example. These effects are obtained, for example, by incorporating fluorescent pigments in different quantities, on the one hand in the fibrous part, and on the other hand, in the plastic part.

According to a particular case of the invention, a watermark is produced in the paper ply and fluorescent particles are incorporated in one of the plastic layers. Thus, when the face containing the fluorescent particles is observed under UV light, a uniform fluorescence is observed over the whole surface; on the other hand, if the other face of the note is observed, differences in fluorescent intensity are distinguished in the watermark, thereby serving to observe the watermark in reflection.

The invention also relates to methods for producing a hybrid sheet with a fibrous part and a plastic part.

According to a particular case of the invention, said hybrid sheet can be obtained particularly by methods of extrusion of the plastic material which is added to the fibrous material, particularly paper.

The extruded quantity of said polymer may, for example, be between and 2 and 20 $g/m^2$ in the plastic part in the overlap zone, and between 80 and 110 $g/m^2$, or the entire basis weight in the case of a note, in the zone of the plastic part that is free of fibrous material.

According to another particular case of the invention, said hybrid sheet may be obtained, after fabrication of each of the respectively fibrous and plastic materials, particularly by pasting or by lamination, particularly with heat, of a plastic film with a fibrous substrate, particularly a paper.

According to another particular case of the invention, said hybrid sheet can be obtained by the in-line combination on a paper machine, of each of the materials, respectively of fibrous material, particularly paper, and of plastic material.

An activation treatment may be provided on the surface of said plastic material and/or the fibrous material, in order to improve the adhesion of the polymer material to said fibrous material. The activation treatment may be carried out by Corona, flame or plasma electric discharge.

An adhesion primer may also be applied to promote the bonding of the plastic material, particularly in film form, to said fibrous material, particularly a paper.

In the particular and preferred case in which the hybrid sheet comprises perforations in the fibrous material-plastic material overlap zone, said perforations may be made prior to the joining of the plastic and fibrous materials, by various means such as drilling, for example by punching, by die cutting, laser cutting, fluid jet cutting particularly by water jet, by ultrasonic cutting.

The invention also relates to a security document comprising the above security sheet. In particular, the invention relates to a banknote.

The invention finally relates to a method for authenticating a document or a sheet as previously described, said sheet or said document being authenticated from the difference in tactile perception between the parts of fibrous and plastic material.

Various embodiments of the invention are presented below in a nonlimiting manner, in conjunction with appended FIGS. 1 to 19.

FIGS. 1 to 8 show a front view of the sheets 1 according to the invention with various configurations of the fibrous part 2 and of the plastic part 3 appearing respectively in gray and in white; the overlap zone 4 is not indicated in these figures.

FIGS. 9 to 13 show a cross section of the sheets 1 according to the invention with details on the overlap zone, the scale not being respected for greater clarity.

FIGS. 14 to 17 show a front view of the sheets 1 according to the invention with details on the perforations 5 which can be made in particular in the overlap zone 4, the scale not being respected for greater clarity.

Figure 18:
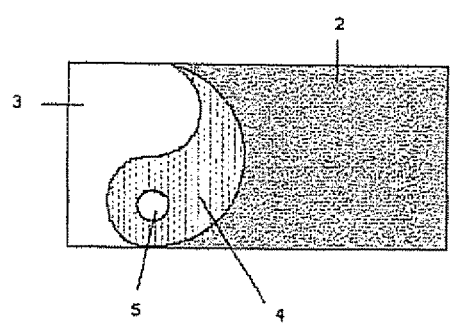
Figure 19:
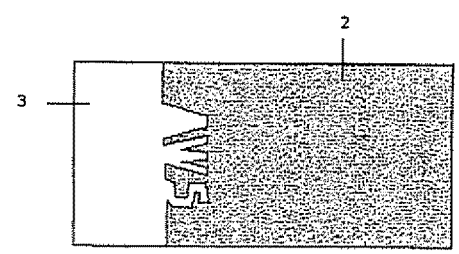

FIGS. 18 and 19 show a front view of the sheets 1 according to the invention with a particular cutout of the plastic 2 and fibrous 3 parts to constitute a motif.

Figure 8:
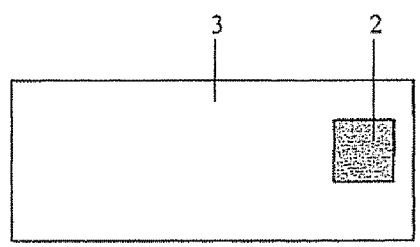

The sheet 1 may, as in FIGS. 1 to 19, have the form of a rectangle such as a banknote, for example having a length of 160 mm and a width of 72 mm. As shown in FIGS. 1 to 8, the fibrous 2 and plastic 3 parts may have highly varied shapes and dimensions. In particular, the plastic part 3 may constitute a corner of a rectangle, as shown in FIG. 1. In another configuration, as shown in FIG. 8, the plastic material 3 may constitute most of the sheet 1, the fibrous part appears as an inclusion within the sheet 1, in a transparent zone, this fibrous part 2 comprising in particular a watermark observable through the plastic part 3.

FIGS. 9 to 13 show details of various alternatives of the overlap zone 4. In the case in which the sheet 1 has the abovementioned dimensions, the overlap zone 4 may have a width in particular of at least 3 mm, preferably at least 5 mm, in particular between 5 and 15 mm, for example between 5 and 7 mm.

Figure 9:
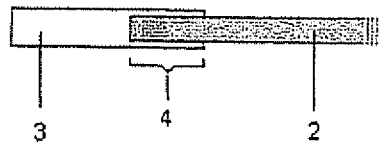

FIG. 9 shows a sheet 1 according to the invention, of which the overlap zone 4 is such that the plastic material 3 overlaps the fibrous material 2 on either side.

Figure 10:
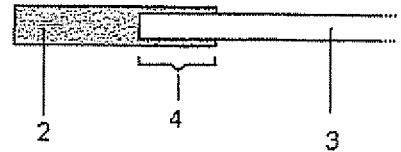

FIG. 10 shows a similar case to that of FIG. 9 but which differs in that, in the overlap zone 4, the fibrous part 2 overlaps the plastic part 3 on either side.

Figure 11:
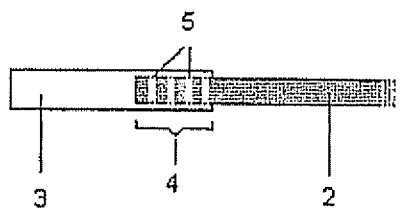

FIG. 11 shows a sheet 1 according to the invention, of which the structure is similar to that shown in FIG. 9, in which the fibrous part 2 also has circular perforations 5, for example having a diameter of 100 μm, at the overlap zone 4. These perforations 5 serve to ensure a good bonding between the fibrous 2 and plastic 3 parts.

Figure 12:
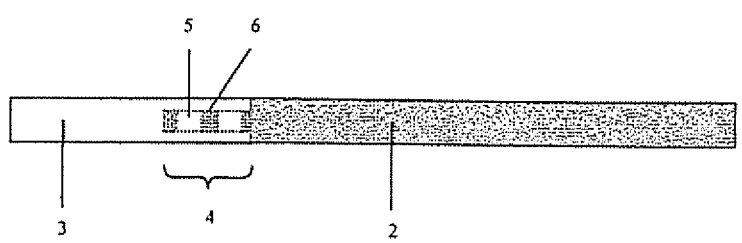

FIG. 12 shows a sheet 1 according to the invention, similar to that shown in FIG. 11, but in which the fibrous part 2 provided with circular perforations 5 has a thinned zone at the overlap zone 4, thereby serving to obtain a sheet 1 having a substantially constant thickness.

Figure 13:
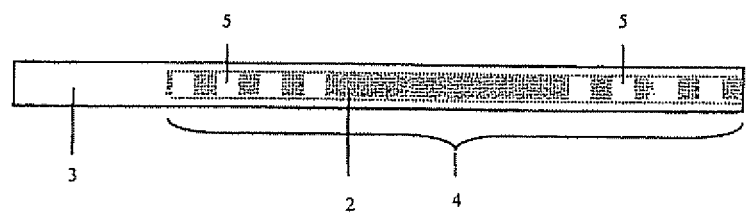

FIG. 13 shows a sheet 1 according to the invention, in which the overlap zone 4 and the fibrous part 2 are merged, the plastic part 3 extending over the whole sheet and overlapping the entire fibrous part 2 on either side. Furthermore, the fibrous part 2 is provided with perforated zones 5, positioned on the edges of said fibrous part.

Figure 14:
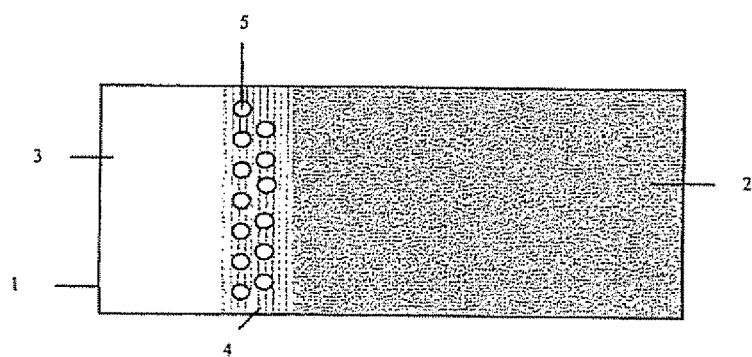

FIG. 14 shows a sheet 1 according to the invention, in which the plastic part 3, at the overlap zone 4, overlaps the fibrous part 2 on either side, and has perforations 5 in this overlap zone 4.

Figure 15:
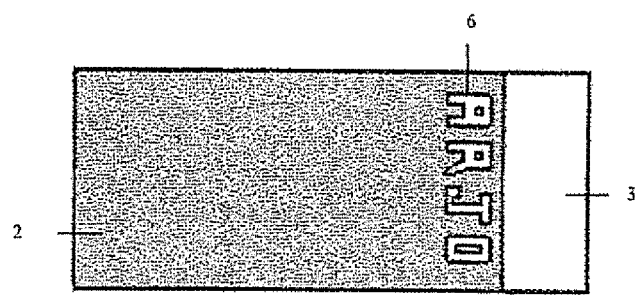

FIG. 15 shows a sheet 1 according to the invention, similar to that shown in FIG. 14, but in which the perforations 5 have the form of a plurality of alphanumeric characters.

Figure 16:
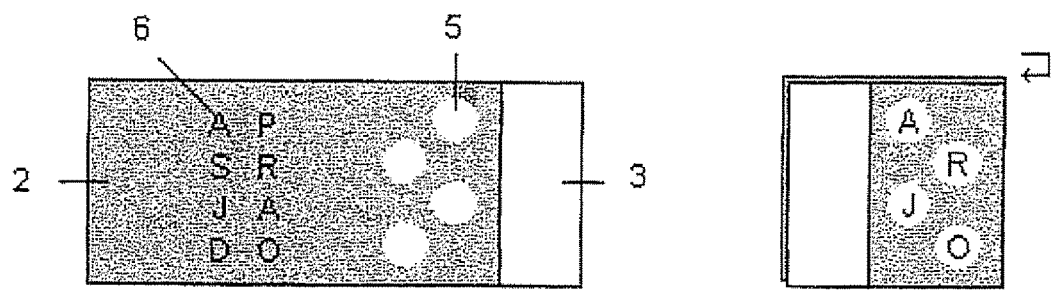
Figure 17:
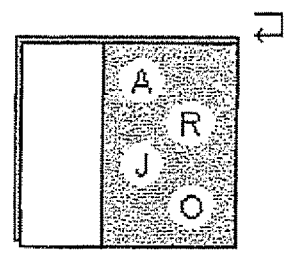

FIGS. 16 and 17 show a sheet 1 according to the invention, in which the plastic part 3 overlaps the fibrous part 2 on either side at the overlap zone and is provided with perforations 5. Moreover, on the side opposite the perforations 5, characters are printed on the fibrous part 2, so that when the sheet is folded on one side, said perforations 5 and said characters 6 cooperate to form an authentication element.

FIGS. 18 and 19 show sheets 1 in which the fibrous part 2 has a particular cutout, in order to form a motif (FIG. 18) and a series of characters (FIG. 19) at the overlap zone 4.

The invention claimed is:

1. A sheet of a given size, having a rear face and a front face,
   wherein the sheet comprises at least one part made from fibrous material and at least one other part made from plastic material, which is adjacent to the fibrous part, said parts being joined at an overlap zone in which the two materials overlap, the plastic part forming a first side region of said sheet, adjacent to the overlap zone, that is free from fibrous material to at least one outside edge of the sheet, the fibrous part forming a second side region of said sheet, adjacent to the overlap zone, that is free from plastic material to at least one outside edge of the sheet,
   wherein said plastic part comprises at least one transparent or translucent zone,
   wherein, at the overlap zone, the plastic material overlaps on either side of the fibrous material,
   wherein the first side region, made from plastic material and free of fibrous material, has an area larger than 1 cm$^2$, and, at least at one point, has a width strictly larger than 10 mm, and
   wherein at the overlap zone, the fibrous material and the plastic material have a lower thickness than their respective thickness in the rest of the sheet.

2. The sheet as claimed in claim 1, wherein the sheet has the shape of a quadrilateral of which the length of each of the sides is at least 50 mm and at most 200 mm.

3. The sheet as claimed in claim 2, wherein the sheet has the shape of a rectangle or a square.

4. The sheet as claimed in claim 1, wherein said transparent or translucent zone of the plastic part is located in the first side region of the sheet.

5. The sheet as claimed in claim 1, wherein said first side region is such that its area is larger than 3 cm$^2$.

6. The sheet as claimed in claim 1, wherein said first side region is such that at least at one point, its width has a value larger than or equal to 15mm.

7. The sheet as claimed in claim 1, wherein said first side region is such that at least at one point, its width has a value larger than or equal to 20mm.

8. The sheet as claimed in claim 1, wherein said overlap zone has delimited dimensions, smaller than those respectively of each of the fibrous and plastic parts.

9. The sheet as claim in claim 8, wherein said overlap zone has a dimension of between 1 and 50% of one of the dimensions of the size of the sheet.

10. The sheet as claimed in claim 9, wherein said overlap zone has a dimension of between 2 and 15% of one of the dimensions of the size of the sheet.

11. The sheet as claimed in claim 1, wherein the plastic part, which is free of fibrous material, represents between 25 and 50% of the total surface of said sheet.

12. The sheet as claimed in claim 11, wherein the plastic part, which is free of fibrous material, represents between 30 and 40% of the total surface of said sheet.

13. The sheet as claimed in claim 1, wherein the fibrous part comprises a thinned zone at said overlap zone.

14. The sheet as claimed in claim 13, wherein said thinned zone is a light watermark or a multitone watermark composed of light zones arranged to constitute a shuted motif.

15. The sheet as claimed in claim 13, wherein said thinned overlap zone is a calendered or laminated zone.

16. The sheet as claimed in claim 1, wherein the sheet, at least in the overlap zone comprises perforations.

17. The sheet as claimed in claim 16, wherein some of said perforations have a size such that the fibers of the fibrous material can be entangled therein.

18. The sheet as claimed in claim 16, wherein some of said perforations have a size which is inscribed in a circle having a diameter higher than 0.05mm.

19. The sheet as claimed in claim 18, wherein at least 50% of said perforations have a size which is inscribed in a circle having a diameter higher than 0.05 mm.

20. The sheet as claimed in claim 16, wherein the fibrous part, at least in the overlap zone, comprises said perforations.

21. The sheet as claimed in claim 16, wherein said perforations have dimensions of between 0.05 and 10 mm.

22. The sheet as claimed in claim 16, wherein said perforations form an alphanumeric motif and/or a design.

23. The sheet as claimed in claim 16, wherein said perforations constitute an authentication element.

24. The sheet as claimed in claim 23, wherein said perforations constitute a code.

25. The sheet as claimed in claim 16, wherein said perforations cooperate with visible characters, mentioned or appearing on at least one of the faces of the sheet, to form data when the sheet is folded.

26. The sheet as claimed in claim 25, wherein said perforations cooperate, when the sheet is folded on one side, to form first data with visible characters, mentioned or appearing on the front face of the sheet and cooperate, when the sheet is folded on the other side, with visible characters, mentioned or appearing on the rear face of the sheet, said characters being identical to or different from the characters of the front face, to form second data, identical to or different from the first data.

27. The sheet as claimed in claim 1, wherein the fibrous part is based on natural fibers and/or synthetic fibers.

28. The sheet as claimed in claim 27, wherein the fibrous part is based on cellulose fibers.

29. The sheet as claimed in claim 28, wherein the fibrous part is based on cotton.

30. The sheet as claimed in claim 1, wherein the fibrous part is a paper or a nonwoven fabric.

31. The sheet as claimed in claim 1, wherein the plastic part is a polymer film.

32. The sheet as claimed in claim 1, wherein the plastic part is polymer adhesive.

33. The sheet as claimed in claim 1, wherein the plastic part is an extruded or coextruded layer of one or more polymers.

34. The sheet as claimed in claim 33, wherein the plastic part is an extruded or coextruded layer of one or more polymers based on polyolefin, polypropylene, low-density polyethylene or blends thereof.

35. The sheet as claimed in claim 1, wherein the plastic part is based on a transparent or translucent polymer.

36. The sheet as claimed in claim 1, wherein the plastic material comprises one or more dyes and/or luminous pigments and/or interferential pigments and/or liquid crystal pigments and/or luminescent light collectors.

37. The sheet as claimed in claim 1, wherein the plastic material is an interferential multilayer film.

38. The sheet as claimed in claim 1, wherein the plastic material is formed from two polymer layers having different colors and/or luminosities and/or interferential effects or luminescent light collectors.

39. The sheet as claimed in claim 1, wherein the plastic part is covered, on at least part thereof, with a layer that is printable and/or promotes the adhesion of ink.

40. The sheet as claimed in claim 1, wherein the plastic part is covered, at least partly, with a layer having antisoiling properties.

41. The sheet as claimed in claim 1, wherein said sheet is a security sheet comprising at least one security element.

42. The sheet as claimed in claim 41, wherein said fibrous part contains security elements.

43. The sheet as claimed in claim 42, wherein said security elements are selected from watermarks, plates, luminous and/or iridescent and/or magnetic and/or metal fibers and/or pigments, security wires and mixtures thereof.

44. The sheet as claimed in claim 1, wherein said plastic part contains security elements.

45. The sheet as claimed in claim 44, wherein said security elements are selected from luminous and/or iridescent fibers and/or pigments, magnetic and/or metal fibers and mixtures thereof.

46. The sheet as claimed in claim 36, wherein said plastic material is a luminous light collecting material located in a zone of the side part of the sheet for observing the luminosity on the edge of the sheet.

47. The sheet as claimed in claim 36, wherein said plastic material is a transparent or translucent luminous light collector, which comprises engraved, embossed, or printed motifs for observing the luminosity on the surface, at least at the motifs.

48. The sheet as claimed in claim 1, wherein at the overlap zone said fibrous part comprises a watermark and said plastic part comprises fluorescent particles.

49. A method for fabricating a sheet as described in claim 1, in which said sheet is obtained by extrusion of the plastic material which is added to the fibrous material.

50. The method as claimed in claim 49, wherein said fibrous material is a paper.

51. A method for fabricating a sheet as described in claim 1, in which said sheet is obtained by pasting or by lamination, of a plastic film with a fibrous substrate.

52. The method as claimed in claim 51, wherein said sheet is obtained by lamination with heat of a plastic film with a fibrous substrate.

53. The method as claimed in claim 51, wherein said fibrous substrate is a paper.

54. The method for fabricating a sheet as claimed in claim 49, in which perforations are made at least in the zone which will be the overlap zone, in one of the materials, prior to their joining, either by punching, by die cutting, laser cutting, ultrasonic cutting, or by fluid jet cutting.

55. The method as claimed in claim 54, wherein said fluid jet cutting is water jet.

56. A security document, comprising a sheet according to claim 1.

57. The security document as claimed in claim 56, wherein said document is a banknote.

58. The sheet as claimed in claim 40, wherein the layer having antisoiling properties comprises colloidal silica and a binder.

59. A sheet of a given size, having a rear face and a front face, wherein the sheet comprises at least one part made from fibrous material and at least one other part made from plastic material, which is adjacent to the fibrous part, said parts being joined at an overlap zone in which the two materials overlap, the plastic part forming a first side region of said sheet, adjacent to the overlap zone, that is free from fibrous material to at least one outside edge of the sheet, the fibrous part forming a second side region of said sheet, adjacent to the overlap zone, that is free from plastic material to at least one outside edge of the sheet, wherein said plastic part comprises at least one transparent or translucent zone, wherein the fibrous material and/or the plastic material comprises perforations at least in the overlap zone, and wherein at least 50% of the perforations have a size which is inscribed in a circle having a diameter higher than 0.05 mm and wherein at the overlap zone, the fibrous material and the plastic material have a lower thickness than their respective thickness in the rest of the sheet.

60. The sheet as claimed in claim 59, wherein said first side region made from plastic material, and free of fibrous material, is such that its area is larger than 1 cm$^2$, and that at least at one point, its width has a value strictly larger than 10 mm.

61. The sheet as claimed in claim 59, wherein, at the overlap zone, the plastic material overlaps on either side of the fibrous material.

62. The sheet as claimed in claim 59, wherein, at the overlap zone, the fibrous material overlaps on either side of the plastic material.

* * * * *